(12) United States Patent
Scalzi

(10) Patent No.: US 7,828,974 B2
(45) Date of Patent: Nov. 9, 2010

(54) METHOD FOR THE TREATMENT OF GROUND WATER AND SOILS USING DRIED ALGAE AND OTHER DRIED MIXTURES

(75) Inventor: Michael Scalzi, Pipersville, PA (US)

(73) Assignee: Innovative Environmental Technologies, Inc., Pipersville, PA (US)

( * ) Notice: Subject to any disclaimer, the term of this patent is extended or adjusted under 35 U.S.C. 154(b) by 249 days.

(21) Appl. No.: 12/250,618

(22) Filed: Oct. 14, 2008

(65) Prior Publication Data

US 2010/0093063 A1   Apr. 15, 2010

(51) Int. Cl.
*C02F 3/32* (2006.01)
*B09C 1/00* (2006.01)
*B09C 1/10* (2006.01)

(52) U.S. Cl. .................. 210/602; 210/631; 405/128.7

(58) Field of Classification Search .............. 210/602, 210/610, 611, 631, 170.07, 909; 405/128.7, 405/128.75
See application file for complete search history.

(56) References Cited

U.S. PATENT DOCUMENTS

| | | |
|---|---|---|
| 494,061 A | 3/1893 | Day |
| 1,929,659 A | 10/1933 | Trumble et al. |
| 2,362,674 A | 11/1944 | Spangler et al. |
| 2,421,765 A | 6/1947 | Taylor |
| 2,424,440 A | 7/1947 | Duffy |
| 2,617,765 A | 11/1952 | Swarr |
| 2,966,921 A | 1/1961 | Whiteman |
| 3,486,297 A | 12/1969 | Eisinga et al. |
| 3,805,819 A | 4/1974 | Etter |
| 4,488,850 A | 12/1984 | Wernimont |
| 5,264,018 A | 11/1993 | Koenigsberg et al. |
| 5,277,815 A | 1/1994 | Beeman |
| 5,411,664 A | 5/1995 | Seech et al. |
| 5,602,296 A | 2/1997 | Hughes et al. |
| 5,833,855 A | 11/1998 | Saunders |
| 5,975,798 A | 11/1999 | Liskowitz et al. |
| 6,068,777 A | 5/2000 | Kimura et al. |
| 6,150,157 A | 11/2000 | Keasling et al. |
| 6,238,570 B1 | 5/2001 | Sivavec |
| 6,245,235 B1 | 6/2001 | Perriello |
| 6,255,551 B1 | 7/2001 | Shapiro et al. |
| 6,265,205 B1 | 7/2001 | Hitchens et al. |
| 6,303,367 B1 | 10/2001 | Kataoka et al. |
| 6,312,605 B1 | 11/2001 | Kerfoot |
| 6,344,355 B1 | 2/2002 | Hince et al. |
| 6,420,594 B1 | 7/2002 | Farone et al. |
| 6,464,864 B2 | 10/2002 | Sivavec |
| 6,472,198 B1 | 10/2002 | Semprini et al. |
| 6,488,850 B2 * | 12/2002 | Perriello ................ 210/605 |

FOREIGN PATENT DOCUMENTS

SU         540619 A  *  2/1977

* cited by examiner

*Primary Examiner*—Fred Prince
(74) *Attorney, Agent, or Firm*—Gregory J. Gore

(57) ABSTRACT

The induction of reducing conditions and stimulating anaerobic process through the addition of dried micro-blue green algae (*Spirulina, Arthorospira Platensis, Arthrospria Maxima, Aphanizomen flos-aquae,* and *chlorella*) and seaweed (Dulse, Nori, and Kelp) to accomplish accelerated dechlorinization of soil and groundwater contaminated with chlorinated solvents and heavy metals.

16 Claims, No Drawings

METHOD FOR THE TREATMENT OF GROUND WATER AND SOILS USING DRIED ALGAE AND OTHER DRIED MIXTURES

FIELD OF THE INVENTION

The present invention relates to the mediation of subsurface soil and ground water contamination. More specifically, it relates to the injection of dried algae and other mixtures for the dechlorination of soil and ground water contaminated with chlorinated solids.

BACKGROUND OF THE INVENTION

This invention aids in the remediation of environmental contaminants in subsurface soils and groundwater via the stimulation of acrobic anaerobic processes. More particularly, this invention relates to remediation processes involving emplacement of solid-phase or aqueous-phase treatment agents with soil fracturing technology. Emplacement of micro-blue green algae and or species of seaweed as electron donors for microorganisms that carry out reductive dechlorination of chlorinated solvent source areas or plumes is illustrative of the invention.

*Spirulina* is the common name for human and animal food supplements produced primarily from two species of cyanobacteria (also known as blue-green algae): *Arthrospira platensis* and *Arthrospira maxima*. These and other *Arthrospira* species were once classified in the genus *Spirulina*. There is now agreement that they are distinct genera, and that the food species belong to *Arthrospira*; nonetheless, the older term *Spirulina* remains the popular name. *Spirulina* is cultivated around the world, and is used as a human dietary supplement as well as a whole food and is available in tablet, flake, and powder form. It is also used as a feed supplement in the aquaculture, aquarium, and poultry industries.

*Spirulina* is rich in gamma-linolenic acid (GLA), and also provides alpha-linolenic acid (ALA), linoleic acid (LA), stearidonic acid (SDA), eicosapentaenoic acid (EPA), docosahexaenoic acid (DHA), and arachidonic acid (AA). *Spirulina* also contains vitamin B 1, B2, B3, B6, B9, B12, vitamin C, vitamin D, and vitamin E.

Other species of *Cyanobacteria*, like *Aphanizomenon flos-aquae* and *Chlorella* share similar nutritional components including omega 3 and 6 fatty acids as well as a wide variety of vitamins, and minerals. Vitamins A, B1(Thiamine), B2 (Riboflavin), B3(Niacin), B6 (Pyrodoxine), B 12 (Cyanocobalamin), and vitamins C and E are present in high concentrations along with many essential amino acids. The high concentrations of many of these valuable nutrients provide optimal living conditions for the anaerobic processes responsible for the remediation of contaminated soil and groundwater sites.

Similar to Cyanobacteria, various species of Seaweed including Dulse, Nori, and Kelp contain substantial nutrients beneficial to anaerobic processes. Available in both flake and powder form, Seaweed has been an essential food source for years, used in sushi, chips, seasoning, and even as a dietary supplement for its high nutritional value. Along with a plethora of vitamins and minerals, seaweeds have long been known for their impressive chemical composition comprised of fatty acids, carbohydrates, and proteins. Their concentrations of vitamins B2, B12 in particular make seaweed, along with blue-green algae an excellent option for environmental remediation. Taken in totality, the use of seaweed and or cyanobacteria offer the micronutrients and volitile fatty acid precursors that will provide long-term production of organic hydrogen necessary for reductive dechlorination of chlorinated solvents in groundwater and soils.

Chlorinated solvents are the most common class of ground water contaminants at hazardous waste sites in the U.S. In a list of the top 25 most frequently detected contaminants at such sites, the Agency for Toxic Substances and Disease Registry (ATSDR) found that 10 of the top 20, including two of the top three, were chlorinated solvents or their degradation products. National Research Council, Alternatives for Ground Water Cleanup (National Academy Press, Washington, D.C. 1994). In fact, the same survey found that the most common contaminant, trichloroethylene (TCE), is present in more than 40% of National Priority List sites. The remediation of ground water contaminated by these compounds often presents unique obstacles related to their inherent characteristics, including hydrophobicity and high density. Many commercial process utilize raw vegetable oils and emulsions which co-elute the targeted solvents within the treatment liquid masking the presence of the compound targeted for treatment rather than stimulating the mineralization of said compound.

Overcoming these obstacles often demands innovation and an interdisciplinary approach that integrates hydrology, geology, chemistry, microbiology, and economics. In particular, an innovative approach has been conceived, and is described herein, to harness recent advances in the understanding of biodegradation processes involving chlorinated solvents for remediating residual source areas, or for cutting off dissolved plumes, by emplacing solid-phase or aqueous-phase treatment agents into a variety of soil types throughout much larger volumes of the subsurface than has been possible using conventional methods. One embodiment of this innovation involves delivering micro-blue green algae, as an electron donor, into induced fractures in low permeability soils to create and maintain nutrient-rich anaerobic conditions that will promote the long-term bioremediation of a chlorinated solvent or other dense nonaqueous phase liquid (DNAPL) source. A second embodiment of this invention includes the addition of a zero-valent metal with the dried micro-blue green algae such that the dissolved chlorinated solvents are both biotically and abiotically degraded.

Natural attenuation of chlorinated solvents by reductive dechlorination often occurs at sites where an electron donor (food source or substrate for microbes) is present along with the chlorinated solvent contamination. As dissolved oxygen and other electron acceptors become depleted some microbes are capable of using the chlorinated solvents as electron acceptors. For selected compounds such as chlorinated ethylenes sequential dechlorination to a harmless byproduct ethylene can be achieved under favorable environmental conditions (EPA/600/ R-98/128 September 1998).

In recent years efforts have been made to produce this anaerobic treatment effect by injection of electron donor into the subsurface. An overview of these technologies can be reviewed in the EPA document Engineered Approaches to In Situ Bioremediation of Chlorinated Solvents: Fundamentals and Field Applications (EPA 542-R-00-008 July 2000). Other inorganic and organic compounds can be degraded or immobilized under anaerobic conditions including selected toxic metals, nitrate, and MTBE. For sites that do not have sufficient amounts of natural electron donors to drive anaerobic natural attenuation, injection of microbial substrates has proven to be a cost-effective treatment or plume migration control measure. The microbial substrates can be injected into the contaminant source area where residual contamination is adsorbed onto soils or injected in a line across a ground water contaminant plume to form a permeable reactive wall to prevent further contaminant migration.

A wide variety of sugars, alcohols, organic acids, and even molecular hydrogen have been used successfully as electron donors to enhance anaerobic biotransformation processes. Most of these compounds are rapidly consumed after injection and must be replaced by either continuous low concentration delivery systems or with frequent batch additions of additive solution. Contaminant source areas can not be effectively removed or even precisely located for many ground water contaminant plumes. The presence of residual chlorinated solvents adsorbed onto soils or present as dense non-aqueous phase product (DNAPL) serves as an example of persistent ground water plume source areas that can last for many decades. These persistent contaminant source areas continue to contaminate ground water for many years such that continuous operation of recirculation systems or frequent substrate injections can be very costly over the life of a project. Long-term injection of substrates into wells or infiltration galleries often leads to severe bacterial fouling problems adding to project operation and maintenance costs.

Recent interest has developed in the use of materials that slowly biodegrade or slowly release organic matter into ground water over time. A variety of vegetable oils have been demonstrated to be effective electron donors to stimulate anaerobic biodegradation. Although edible oils such as soybean oil have a much lower viscosity than a semisolid product, distribution in saturated soils is difficult. Soybean oil has a viscosity approximately 80 times higher than water, which results in multiphase fluid flow and potential oil blockage of soil porosity. Injection of pure oil or large droplets of emulsified oil blocks soil pores producing treatment zones that are ineffective because they prevent free flow of ground water through the oil treated area. Injection of pure soybean oil into porous soil media has been shown to reduce water permeability by up to 100%.

In addition to slowly biodegradable hydrogen sources, soil and groundwater remediation process that utilize zero-valent metals have been applied with varying success. In the second embodiment of the invention the addition of zero-valent metals to the micro-blue green algae allows for maintained reducing conditions resulting in greater longevity of the reactive metal surface. Zero-valent metal particles have been proven to effectively degrade halogenated solvents. For example, the mechanism and reaction rates of which iron reduces chlorinated aliphatics has been studied extensively due to iron's low cost and low toxicity.

Additionally, the pathways of the dehalogenation of DNAPL's such as TCE have been proposed. TCE undergoes hydrogenolysis where the replacement of each of the three chlorines occurs sequentially. TCE reduces to cis-1,2-dichloroethene, trans-1,2-dichloroethene, and 1,1-dichloroethene. These intermediates in turn reduce to ethene and ethane.

SUMMARY OF THE INVENTION

To overcome the foregoing problems, the present invention utilizes dried micro-blue green algae and dried micro-seaweed species like non or dulse. Micro-blue green algae are rapid growing aquatic organisms that take their energy directly from the sun and the minerals in water, they contain amino acid proteins, organic vitamin B12, iron and essential fatty acids including gamma-linolenic acid (GLA), alpha-linolenic acid (ALA), linoleic acid (LA), stearidonic acid (SDA), eicosapentaenoic acid (EPA), docosahexaenoic acid (DHA), and arachidonic acid (AA). These organisms also are highly alkalizing, as a consequence their addition counteracts the natural production of acids produced by-way of anaerobic dechlorinization. These organisms are commercially available dried, in large quantities. The dechlorination process may be further accelerated by the addition of a zero-valent metal powder to the dried micro-blue green algae. When emplaced in groundwater and soils impacted by chlorinated solvents the micro-blue green algae offer all the needed components for effective and rapid remediation of compounds such as tetrachloroethane, tetrachloroethene, trichloroethane, trichloroethene, carbon tetrachloride and their anaerobic daughter products.

The actions of the algae or seaweeds on the subsurface may be further enhanced with the inclusion of zero-valent metal particles. Alone, or in a mixture, the micro-blue green algae is particularly suited for dehalogenation of solvents including, but not limited to, tetrachloroethane, tetrachloroethene, trichloroethane, trichloroethene, carbon tetrachloride and their anaerobic daughter products. The present invention achieves accelerated dechlorination of soil and ground water contaminated with chlorinated solvents by stimulating anaerobic microorganisms and thus increasing the rate of biological mineralization of the solvents.

More specifically the invention comprises a method for accelerating biotic dechlorination of ground water and soils provided by the steps of first injecting into the ground water and soils by way of temporary rods or permanent wells a mixture containing a predetermined mass of micro blue-green algae under pressure. Next, a mixture containing zero valent metal particles is injected to react with the dissolved chlorinated solvents. A second mixture containing zero valent metal particles is then injected so that the corrosion of the metal particles results in the elevation of the bulk PH of the surrounding ground water. Finally, micro blue-green algae is again injected into the ground water and soils with an oxygen scavenger to remove oxygen and ensure that the subsurface environment is reductive. All injections of materials are done in such a matter as to ensure there dispersion into the subsurface. Alternately, a simple single step method of employing the invention is injecting a solution of zero valent iron, blue-green algae or seaweed, and sodium sulfite into the subsurface using a pump.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

One embodiment of the present invention is carried out in the following steps.

Step 1: Subsurface Pathway Development

A gas is delivered to the subsurface as follows. Injection points are advanced via traditional direct push technology using injection rods or may be permanently installed injection wells. The gas is introduced at approximately 175 psi such that delivery pathways and voids are established. Pathway development is verified by observing a substantial pressure drop at the surface monitoring point. The gas is used so as not to introduce oxygen into an environment targeted for anaerobic processes.

Step 2: Sodium Sulfite and Blue-Green Algae OR Sodium Sulfite and Seaweed

Next a solution of sodium sulfite and blue-green algae is immediately injected into the subsurface fractures and voids that were developed during the gas injection step. Sodium sulfite acts as an oxygen scavenger, iron reducer, and sulfate source. As an oxygen scavenger, the sodium sulfite prevents the oxidation of the later-injected ZVI (Zero Valent Iron) by the dissolved oxygen while promoting anaerobic conditions that are favorable for the biodegradation of the DVOCs. Blue-green algae is an organic hydrogen donor, with necessary vitamins and minerals.

Step 3: Zero Valent Iron (ZVI) Injection

Immediately following the sodium sulfite/blue-green algae solution injection, ZVI is added to an additional quantity of the blue-green algae solution and the colloidal suspension is injected to reduce concentrations of dissolved-phase CVOCs while providing for rapidly generated hydrogen for the microbial stimulation.

Step 4: Post Liquid Injection-Gas Injection

The injection lines are cleared of liquids by a second gas injection and all injectants are forced into the created formation and upward into the vadose zone. Once the injection cycle is complete, the injection point is temporarily capped to allow for the pressurized subsurface to accept the injectants. Once back-pressure diminishes, the injection rods are extracted. Injection boring locations are then sealed with bentonite or sand to prevent short-circuiting from adjacent injection locations. The following table depicts an amount of injectants that could be used in this embodiment.

| Component | Concentration |
| --- | --- |
| Blue Green Algae | 5% by weight |
| Kelp | 55% by weight |
| Iron | 45% by weight |

Another embodiment of the present invention is carried out in the following steps.

Step 1: Suspension Injection

A solution of zero-valent iron, blue-green algae (or seaweed) and sodium sulfite is injected into the subsurface using a pump. The following table depicts an amount of injectants that could be used in this embodiment.

| Component | Concentration |
| --- | --- |
| Blue Green Algae | 45% by weight |
| Iron | 55% by weight |

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method for accelerated biotic dechlorination of groundwater and soils, whereby anaerobic processes are stimulated comprising the following steps of:
   injecting into the groundwater and soils via temporary rods or permanent wells a mixture containing a predetermined mass of micro-blue green algae under pressure;
   injecting a mixture containing zero valent metal particles to react with dissolved chlorinated solvents;
   injecting a mixture containing zero valent metal particles so that the corrosion of said metal particles results in the elevation of the bulk pH of the surrounding groundwater; and
   injecting micro-blue green algae in combination with an oxygen scavenger into the groundwater and soils to remove oxygen and ensure the subsurface environment is reductive.

2. The method of claim 1 wherein the pressure is achieved via compressed gas or a liquid pumping system.

3. The method of claim 1 wherein the delivered materials are educed into the compressed gas stream.

4. The method of claim 3 wherein the delivered materials are pumped as a liquid.

5. The method of claim 4 wherein when the materials are pumped, they are pumped as a suspension.

6. The method of claim 3 wherein said gas is from the group consisting of nitrogen or carbon dioxide.

7. The method of claim 1 wherein the zero-valent metal particles is a powder consisting of particles between 100 nanometers and 500 micrometers in diameter.

8. The method of claim 1 wherein the suspension of materials includes an oxygen scavenger such as a reducing agent.

9. The method of claim 8 wherein the reducing agent is sodium bisulfite.

10. The method of claim 1 further including the step of injecting the mixtures and materials in such a manner as to ensure their dispersion into the subsurface.

11. The method of claim 1 wherein said metal particles are iron particles.

12. The method of claim 1 wherein the step of injecting a predetermined mass of micro-blue green algae includes kelp mixed with the algae.

13. A method for accelerated biotic dechlorination of groundwater and soils, whereby anaerobic processes are stimulated comprising the step of:
   injecting into groundwater and soils under pressure a mixture containing micro-blue green algae zero-valant metal particles and kelp.

14. The method of claim 13 wherein said metals is iron.

15. The method of claim 13 wherein the entireties of the materials are commingled immediately prior to emplacement into the subsurface.

16. The method of claim 15 wherein the entirety of the materials are packaged together as a mixture.

* * * * *